United States Patent
Fujimoto et al.

(10) Patent No.: US 11,279,031 B2
(45) Date of Patent: Mar. 22, 2022

(54) MOBILE ROBOT, MOVEMENT CONTROL SYSTEM, AND MOVEMENT CONTROL METHOD

(71) Applicant: FUJIFILM BUSINESS INNOVATION CORP., Tokyo (JP)

(72) Inventors: Hideki Fujimoto, Kanagawa (JP); Mariko Miyazaki, Kanagawa (JP); Hajime Kajiyama, Kanagawa (JP); Akira Ichikawa, Kanagawa (JP); Naoya Ogata, Kanagawa (JP); Tetsuya Kobayashi, Kanagawa (JP); Toshihiko Shibusawa, Kanagawa (JP); Masatoshi Maruo, Kanagawa (JP); Kunitoshi Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/732,652

(22) Filed: Jan. 2, 2020

(65) Prior Publication Data
US 2020/0130183 A1    Apr. 30, 2020

Related U.S. Application Data

(63) Continuation of application No. 15/447,947, filed on Mar. 2, 2017, now Pat. No. 10,556,339.

(30) Foreign Application Priority Data

Jul. 5, 2016    (JP) .................................. 2016-133232

(51) Int. Cl.
*B25J 9/00* (2006.01)
*B25J 9/16* (2006.01)
(Continued)

(52) U.S. Cl.
CPC .......... *B25J 9/1664* (2013.01); *G05D 1/0011* (2013.01); *G06Q 50/12* (2013.01);
(Continued)

(58) Field of Classification Search
CPC ....... B25J 9/1664; G06Q 50/12; G01C 21/00; G05D 1/0011; Y10S 901/01
See application file for complete search history.

(56) References Cited

U.S. PATENT DOCUMENTS

2002/0165638 A1  11/2002  Bancroft et al.
2003/0214524 A1  11/2003  Oka
(Continued)

FOREIGN PATENT DOCUMENTS

CN    105415385 A    3/2016
JP    H7-325620 A    12/1995
(Continued)

OTHER PUBLICATIONS

U.S. Appl. No. 61/929,007, filed Jan. 2014, Stoschek; Arne.*
(Continued)

*Primary Examiner* — Ian Jen
(74) *Attorney, Agent, or Firm* — Oliff PLC

(57) ABSTRACT

A mobile robot includes a receiving unit that receives a request for providing a service, a notifying unit that notifies a client that the request is received by performing an operation oriented toward the client who has made the request, a moving unit that moves toward a user designated as a receiver of the service in accordance with the request, and a providing unit that provides the service.

12 Claims, 5 Drawing Sheets

(51) Int. Cl.
  *G05D 1/00* (2006.01)
  *G06Q 50/12* (2012.01)
  *G01C 21/00* (2006.01)
  *G01C 21/20* (2006.01)

(52) U.S. Cl.
  CPC ........... *G01C 21/00* (2013.01); *G01C 21/206* (2013.01); *Y10S 901/01* (2013.01)

(56) References Cited

U.S. PATENT DOCUMENTS

| | | | |
|---|---|---|---|
| 2006/0004487 A1* | 1/2006 | Sugiyama | B60R 25/257 |
| | | | 700/245 |
| 2006/0004488 A1* | 1/2006 | Sugiyama | G06Q 30/06 |
| | | | 700/245 |
| 2006/0142896 A1* | 6/2006 | Yokoyama | B25J 13/082 |
| | | | 700/245 |
| 2011/0245974 A1 | 10/2011 | Kawamoto et al. | |
| 2014/0309835 A1 | 10/2014 | Yamamoto | |
| 2015/0183112 A1 | 7/2015 | Song et al. | |
| 2015/0205298 A1* | 7/2015 | Stoschek | B60L 50/60 |
| | | | 701/23 |
| 2016/0350589 A1* | 12/2016 | Chiu | B25J 13/00 |
| 2017/0352351 A1* | 12/2017 | Kimura | B25J 11/001 |

FOREIGN PATENT DOCUMENTS

| | | |
|---|---|---|
| JP | H11-272328 A | 10/1999 |
| JP | 2001-105363 A | 4/2001 |
| JP | 2004-243504 A | 9/2004 |
| JP | 3837505 B2 | 10/2006 |
| JP | 2008-152504 A | 7/2008 |
| JP | 5526942 B2 | 6/2014 |
| JP | 2014-209293 A | 11/2014 |

OTHER PUBLICATIONS

May 12, 2020 Office Action issued in Japanese Patent Application No. 2016-133232.
Sep. 29, 2020 Office Action issued in Japanese Patent Application No. 2016-133232.
Aug. 17, 2021 Office Action issued in Chinese Patent Application No. 201710262190.8.

* cited by examiner

MOBILE ROBOT, MOVEMENT CONTROL SYSTEM, AND MOVEMENT CONTROL METHOD

CROSS-REFERENCE TO RELATED APPLICATIONS

This application is a continuation of U.S. patent application Ser. No. 15/447,947 filed Mar. 2, 2017, which is based on and claims priority under 35 U.S.C. § 119 from Japanese Patent Application No. 2016-133232 filed Jul. 5, 2016. All of the above-mentioned documents are hereby incorporated by reference in entirety.

BACKGROUND

Technical Field

The present invention relates to mobile robots, movement control systems, and movement control methods.

SUMMARY

According to an aspect of the invention, there is provided a mobile robot including a receiving unit that receives a request for providing a service, a notifying unit that notifies a client that the request is received by performing an operation oriented toward the client who has made the request, a moving unit that moves toward a user designated as a receiver of the service in accordance with the request, and a providing unit that provides the service.

BRIEF DESCRIPTION OF THE DRAWINGS

An exemplary embodiment of the present invention will be described in detail based on the following figures, wherein.

DETAILED DESCRIPTION

1. Configuration

Figure 1:
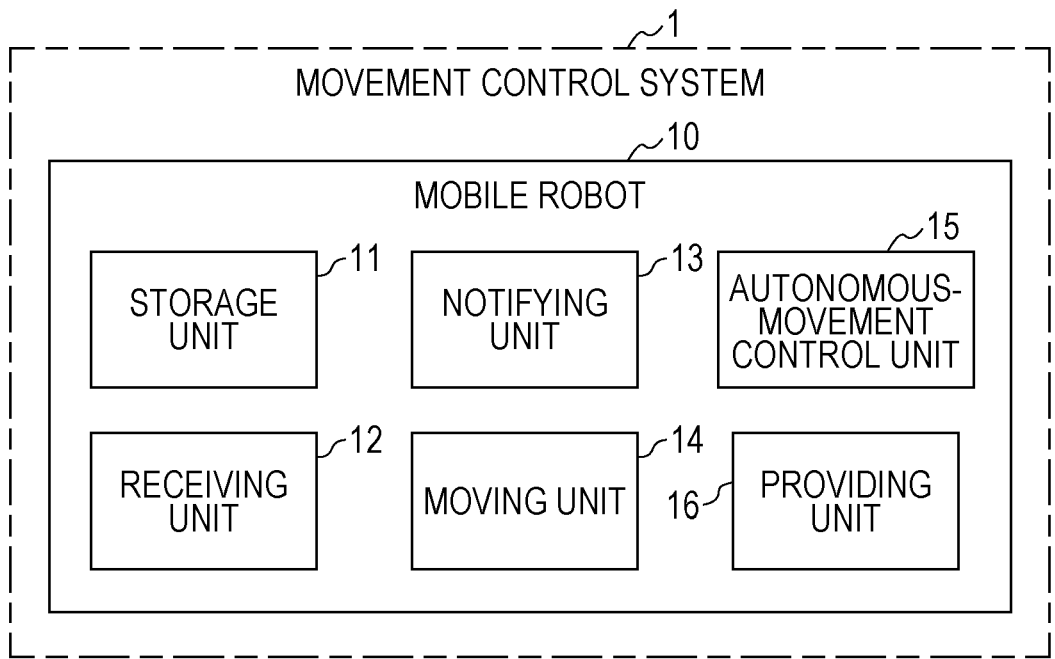
FIG. 1 illustrates a functional configuration of a movement control system according to an exemplary embodiment.

FIG. 1 illustrates a functional configuration of a movement control system 1 according to an exemplary embodiment. The movement control system 1 includes a mobile robot 10. The mobile robot 10 is a device that moves autonomously. The mobile robot 10 moves by, for example, autonomously determining a route to a client so as to provide a service thereto. The mobile robot 10 may have any shape so long as it moves autonomously. For example, the mobile robot 10 may have a human-like shape or may have a shape different from a human-like shape. Examples of services to be provided include providing a beverage (such as coffee or tea) and providing a light meal (such as a snack). Normally, there are various conceivable methods for requesting a service to the mobile robot 10. Specifically, in order to fully utilize the fact that the robot is "movable", the mobile robot 10 receives a request from a remote location. However, when making a request from a remote location, it may be difficult for the client to recognize whether the request has been received. This problem is noteworthy especially if there are multiple client candidates. This exemplary embodiment deals with this problem.

The movement control system 1 has a storage unit 11, a receiving unit 12, a notifying unit 13, a moving unit 14, an autonomous-movement control unit 15, and a providing unit 16. The storage unit 11 stores map data therein. The map data indicates a map of a range within which the mobile robot 10 is movable. The receiving unit 12 receives a request for providing a service. The notifying unit 13 notifies a client that a request has been received by performing an operation oriented toward the client. The term "operation oriented toward the client" refers to an operation for directly notifying the client without being intervened by a communication network, such as an operation for causing a predetermined section of the mobile robot 10 to face the client or an operation for releasing sound for identifying the client (e.g., a voice calling out the name of the client).

The moving unit 14 causes the mobile robot 10 to move. The autonomous-movement control unit 15 controls the moving unit 14 for autonomous movement of the mobile robot 10. The term "autonomous movement" refers to movement of the robot itself based on its own decision without any specific human command. The providing unit 16 provides a predetermined service. The providing unit 16 may be configured to provide the service automatically (e.g., a robot that automatically pours coffee into a cup and automatically hands over the cup filled with the coffee to a client) or simply hold items to be provided for the service (e.g., a table having a coffee pot and cups accommodated therein).

Figure 2:
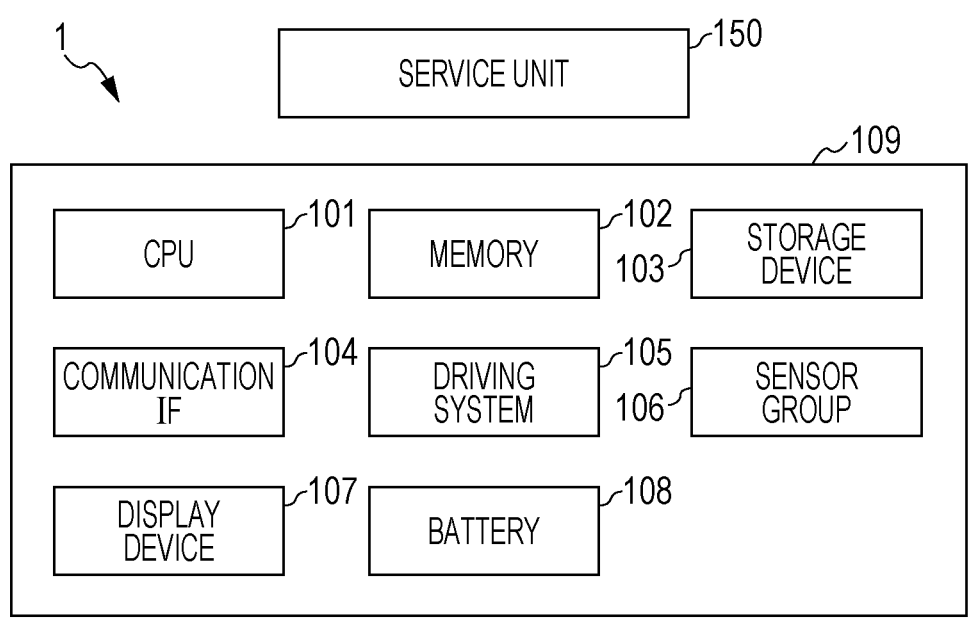
FIG. 2 illustrates a hardware configuration of a mobile robot.

FIG. 2 illustrates a hardware configuration of the mobile robot 10. The mobile robot 10 has a central processing unit (CPU) 101, a memory 102, a storage device 103, a communication interface (IF) 104, a driving system 105, a sensor group 106, a display device 107, a battery 108, and a housing 109.

The CPU 101 is a processor that controls other components of the mobile robot 10. The memory 102 is a storage device functioning as a work area to be used by the CPU 101 for executing a program and includes, for example, a random access memory (RAM). The storage device 103 stores various types of programs and data therein and includes, for example, a solid state drive (SSD) or a hard disk drive (HDD). The communication IF 104 communicates with another device in accordance with a predetermined wireless or wired communication standard (e.g., Wi-Fi (registered trademark), Bluetooth (registered trademark), or Ethernet (registered trademark)).

The driving system 105 is a mechanism for moving the mobile robot 10 and includes, for example, multiple wheels, tires attached to these wheels, a motor for driving these wheels, and a mechanism for changing the direction of these wheels. The sensor group 106 is a sensor (i.e., an example of a detector) that detects various types of information used in autonomous movement, searching of a client, or receiving of a command, and includes at least one of a time-of-flight (TOF) sensor, a stereo camera, a thermal image camera, a microphone, a moving-amount sensor, and an infrared sensor. The display device 107 (i.e., an example of a display) displays various types of information and includes, for example, a liquid crystal display (LCD). The battery 108 is for supplying electric power for driving other components, such as the CPU 101 and the driving system 105, and is, for example, a lithium ion battery. The housing 109 accommodates and retains other components including from the CPU 101 to the battery 108.

In this example, the mobile robot 10 further has a service unit 150. The service unit 150 provides a service to a client and includes, for example, a coffee server or a snack box. The service unit 150 is connected to the housing 109.

Furthermore, in this example, the storage device 103 stores therein a program for controlling the driving system 105 so as to cause the mobile robot 10 to move autonomously (referred to as "autonomous movement program" hereinafter) and a program for setting a destination in accordance with a command from a user or a user terminal (not shown) (referred to as "movement control program" hereinafter). The CPU 101 executes these programs so that the functions shown in FIG. 1 are implemented in the mobile robot 10. The storage device 103 is an example of the storage unit 11. The CPU 101 executing the movement control program is an example of the receiving unit 12 and the notifying unit 13. The driving system 105 is an example of the moving unit 14. The CPU 101 executing the autonomous movement program is an example of the autonomous-movement control unit 15. The service unit 150 is an example of the providing unit 16.

Furthermore, in this example, the storage device 103 stores map data indicating a region in which the mobile robot 10 is movable. The autonomous movement program and the movement control program refer to this map data so as to perform an autonomous movement process and a destination setting process.

2. Operation

Figure 3:
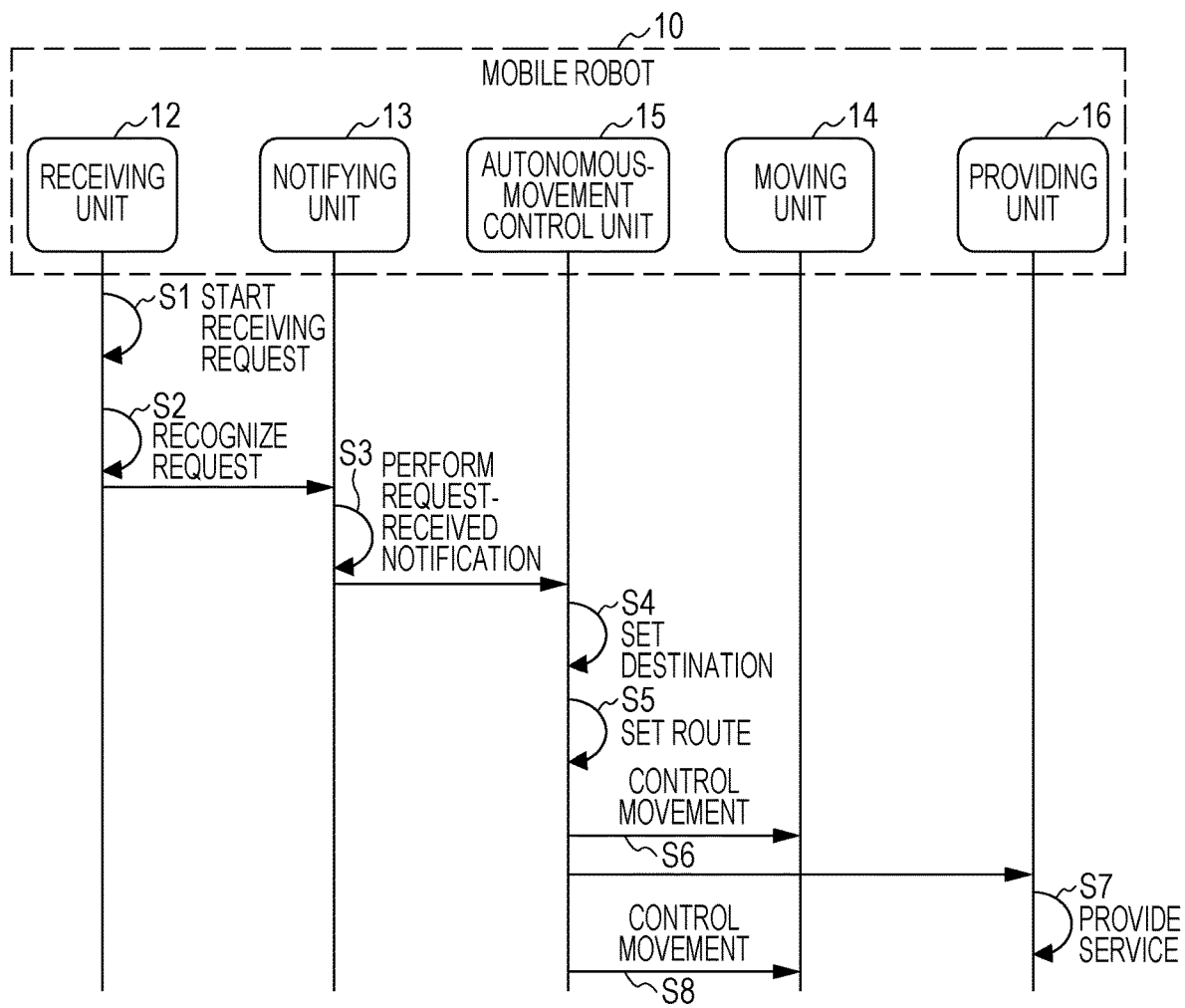
FIG. 3 is a sequence chart schematically illustrating the operation of the movement control system.

FIG. 3 is a sequence chart schematically illustrating the operation of the movement control system 1. The flow in FIG. 3 commences when, for example, the mobile robot 10 is activated. Although the process described below is principally performed by functional components, such as the receiving unit 12, the hardware components and the software components corresponding to the functional components operate in cooperation with each other to execute the process.

In step S1, the receiving unit 12 starts receiving a request. The receiving unit 12 first acquires information detected by the sensor group 106. In this example, the sensor group 106 detects an image and sound surrounding the mobile robot 10 and also detects the distance to a target. First, the receiving unit 12 recognizes a person in the image acquired from the sensor group 106. The person appearing in the image is a client candidate. For each person appearing in the image, the receiving unit 12 stores information for specifying the person (e.g., information for recognizing and specifying the person's face, clothing, physique, color, or direction as viewed from the mobile robot 10) into the storage unit 11. If there are multiple people appearing in the image, these people become client candidates.

In step S2, the receiving unit 12 recognizes the request. For example, the receiving unit 12 determines whether or not the person appearing in the image (i.e., moving image) is performing a predetermined gesture. For each kind of request, the storage unit 11 stores gesture-specifying information (e.g., a feature quantity of human movement). For example, each kind of request refers to a type of service to be received (e.g., providing of coffee or snack). The receiving unit 12 refers to the information stored in the storage unit 11 and determines whether the predetermined gesture is being performed. If it is determined that the predetermined gesture is being performed, the receiving unit 12 recognizes that the gesture is a request for receiving a service. If it is determined that the predetermined gesture is not performed, the receiving unit 12 determines that a request for receiving a service is not made. In a case where multiple people are appearing in the image, the receiving unit 12 determines whether the predetermined gesture is performed on a person-by-person basis. In place of or in addition to recognizing a request by using an image, the receiving unit 12 may recognize a request by using, for example, sound.

If it is recognized that multiple people are making requests, the receiving unit 12 stores, into the storage unit 11, the kinds of the requests and the information for specifying the people who have made those requests (simply referred to as "clients" hereinafter) in correspondence with each other. The receiving unit 12 further stores, into the storage unit 11, sequence-specifying information (e.g., time stamps) with respect to the multiple clients in correspondence with the kinds of the requests.

For example, a time stamp indicates the time at which a gesture related to a request is started. For example, in a case where a user A first starts to perform a gesture α and another user B subsequently starts to perform a gesture β, the gesture β may sometimes be recognized first due to the gesture β being, for example, simpler. In this case, if a time stamp indicating the time at which the recognition of each gesture is completed is stored into the storage unit 11 as the sequence-specifying information, the user A may possibly complain. In this exemplary embodiment, a time stamp indicating the time at which a gesture related to a request is started is used. If the above-described case does not occur or is not a problem, a time stamp indicating the time at which the recognition of each gesture is completed may be used.

In step S3, the notifying unit 13 notifies the client that the request has been received. This notification will be referred to as "request-received notification" hereinafter. For example, the request-received notification is performed by using a visual method, an audial method, or a combination of these methods. According to this example, it is possible to clearly express that the request has been received. As an example, the notifying unit 13 performs an operation for causing a predetermined section of the mobile robot 10 to face the client. The "predetermined section" in this case is, for example, a section corresponding to a face in a case where the housing 109 of the mobile robot 10 has a shape that resembles the shape of an animal or human. In particular, if the mobile robot 10 has structures corresponding to eyes, the notifying unit 13 may move the eyes so as to make eye contact with the client. In another example, the "predetermined section" is a section corresponding to a camera lens in the sensor group 106. In another example, the "predetermined section" is a section corresponding to the display surface of the display device 107. In this example, the notifying unit 13 may display, on the display device 107, for example, a message, an image, or facial text indicating that the request has been received. Alternatively, if the mobile robot 10 has a light-emitting member, such as a lamp, the notifying unit 13 causes this light-emitting member to face the client and emit light. In another example, the notifying unit 13 controls the moving unit 14 such that the side defined as the front surface of the mobile robot 10 faces the client. Upon performing the request-received notification, the notifying unit 13 stores, into the storage unit 11, information indicating that the request-received notification related to the request is completed.

Figure 4:
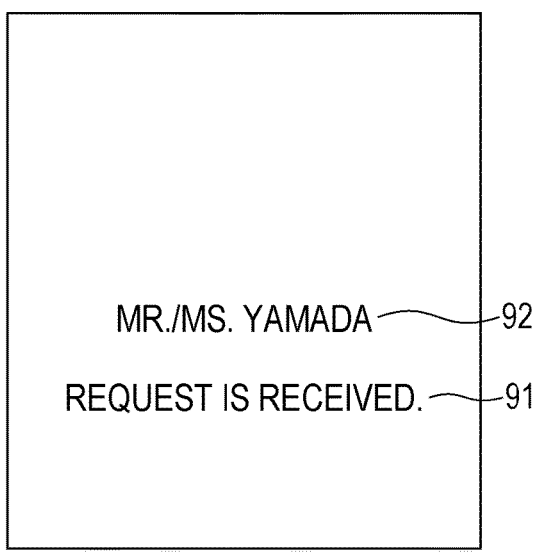
FIG. 4 illustrates an example of request-received notification.

FIG. 4 illustrates an example of the request-received notification. In this example, the request-received notification is performed by using a screen displayed by the display device 107. This screen includes a message 91 and a user ID 92. The message 91 indicates that a request has been received. The user ID 92 is client-specifying information. For example, the storage unit 11 stores a database for performing client face authentication, and the receiving unit 12 performs face authentication using the information detected by the sensor group 106 so as to specify a client.

In a case where it is recognized that multiple clients are making requests, the notifying unit 13 sequentially performs notification starting from the first-most request (i.e., the request with the oldest time stamp) specified based on the sequence-specifying information stored in the storage unit 11 from among requests for which the request-received notification is not completed. When there are no more requests for which the request-received notification is not completed, the notifying unit 13 notifies the autonomous-movement control unit 15 that the request-received notification is completed.

If a request is not receivable due to a certain reason, the notifying unit 13 notifies the relevant client that the request is not receivable. Examples of a case where a request is not receivable include a case where a service is in the process of being provided and a case where it is expectantly difficult to provide a service within a predetermined time due to accumulated reserved requests.

Referring back to FIG. 3, in step S4, the autonomous-movement control unit 15 sets a destination. The destination is a location near a client. For example, the destination is a point where the distance to the client is within a predetermined distance (e.g., a distance reachable by the client) on a route from the present location of the mobile robot 10 to the location of the client. The location of the client (i.e., the direction and distance with reference to the mobile robot 10) is specified by the receiving unit 12 by using the information detected by the sensor group 106.

In step S5, the autonomous-movement control unit 15 sets a route to the destination. The autonomous-movement control unit 15 reads the map data from the storage unit 11 and uses the read map data to set the route. A known algorithm is used for setting the route to the destination. If the accuracy for specifying the location of the client is low and the location of the client is specifiable only within a range having a certain size, the autonomous-movement control unit 15 sets a representative point of that range (e.g., a point with the shortest distance from the present location of the mobile robot 10 or a median point) as the destination.

In step S6, the autonomous-movement control unit 15 controls the moving unit 14 so as to move along the route. The autonomous-movement control unit 15 uses the information detected by the sensor group 106 so as to move while checking that there are no obstacles on the route. If an obstacle is detected, the autonomous-movement control unit 15 corrects the route so as to avoid the obstacle.

Upon reaching the destination, the autonomous-movement control unit 15 searches for the client. In this case, the autonomous-movement control unit 15 may perform a process for prompting the client to give a request start signal. A request start signal is given by, for example, at least one of client's gesture and voice, and the contents thereof are set in advance. Alternatively, the client may operate an input device (not shown and may be, for example, a touchscreen or a button) provided in the mobile robot 10 so as to input the request start signal.

If the client is not findable, the autonomous-movement control unit 15 performs an operation indicating that the client is not findable. This operation involves, for example, shaking the section corresponding to the face in left and right directions. In addition to or in place of the operation for shaking the face in left and right directions, the autonomous-movement control unit 15 may display client-specifying information (e.g., name or identification number) on the display device 107 or may output this information as sound. The client who sees this operation performs the requesting gesture again. The receiving unit 12 recognizes the request, as described in step S2. In this case, the receiving unit 12 specifies the client in accordance with information, such as the client's face, clothing, physique, and color. The receiving unit 12 refers to the information stored in the storage unit 11 and determines whether this request is a request currently being processed or a request from another user. If it is determined that this request is a request from another user, the receiving unit 12 stores the information related to this request into the storage unit 11. If it is determined that this request is a request currently being processed, the receiving unit 12 specifies the location of the client by using the information detected by the sensor group 106. After specifying the location of the client, the autonomous-movement control unit 15 repeats the process from step S5 to step S6.

In step S7, the providing unit 16 provides the service. Before providing the service, the movement control program may authenticate whether the client is the proper client. This authentication may be, for example, face authentication, fingerprint authentication, voice-print authentication, or password authentication. In the case where the authentication is performed, the providing unit 16 provides the service when the client is authenticated. If the client is not authenticated, the providing unit 16 does not provide the service.

In step S8, the autonomous-movement control unit 15 controls the moving unit 14 so as to move to a standby position. The standby position is set in advance. The movement control system 1 may have a charging station (not shown), and the autonomous-movement control unit 15 may set the location of the charging station as the standby position. Alternatively, instead of setting a specific standby position in the movement control system 1, the autonomous-movement control unit 15 may wait for the next request while cruising through a predetermined region.

3. Modifications

The exemplary embodiment of the present invention is not limited to that described above and permits various modifications. Some modifications will be described below. Of the following modifications, two or more thereof may be combined.

3.1. First Modification

The method by which the receiving unit 12 receives a request is not limited to that described in the exemplary embodiment. For example, a user may request a service by presenting a card with a predetermined color (e.g., a black card for requesting coffee and a green card for requesting tea) to the mobile robot 10.

Figure 6:
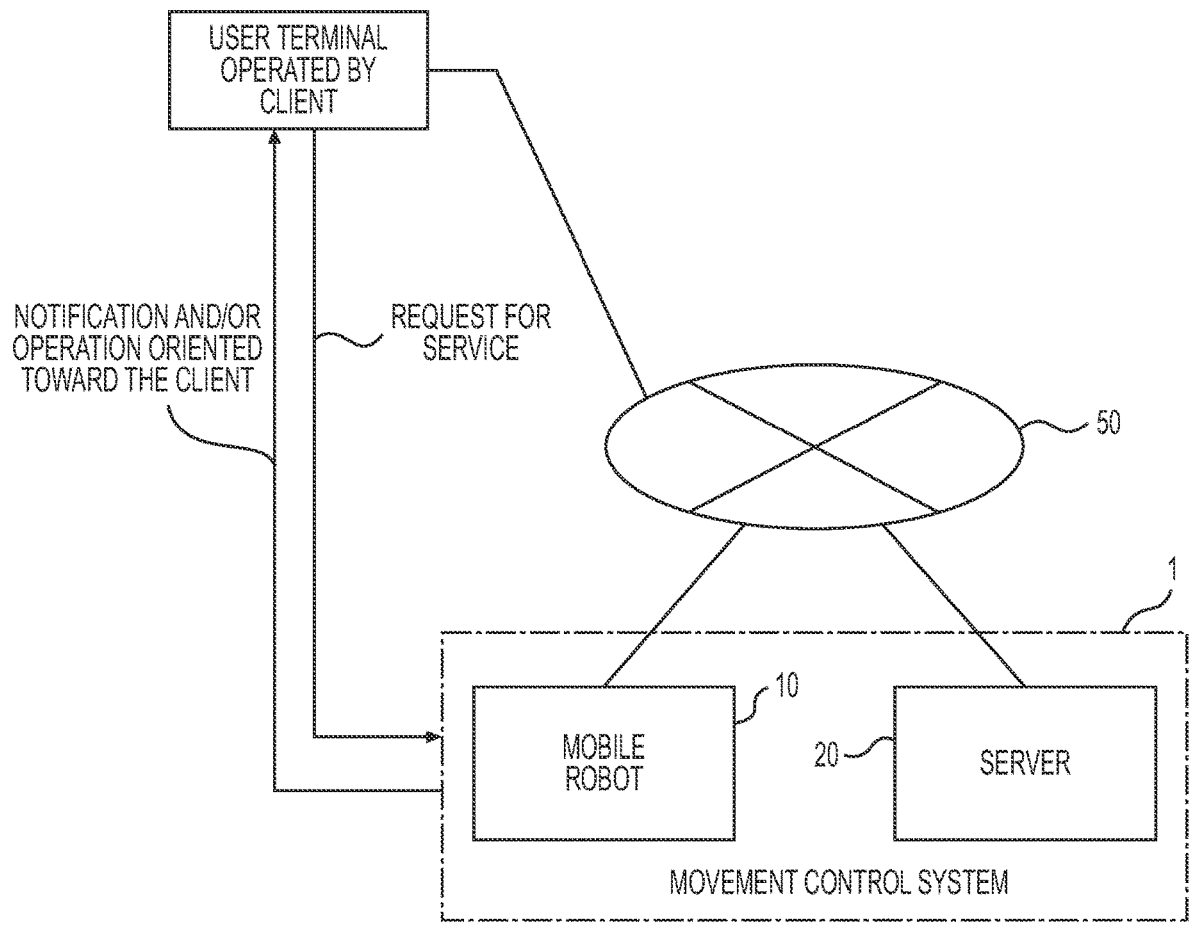
FIG. 6 illustrates the configuration of a movement control system according to a first modification.

Furthermore, instead of receiving a request in accordance with the information detected by the sensor group 106, the receiving unit 12 may receive a request via a user terminal (not shown). The user terminal is a user-operated computer (such as a smartphone). The mobile robot 10 and the user terminal are connected to each other directly or via a network in a wireless or wired manner. In addition to the request, the user terminal transmits a user ID for specifying the client to the mobile robot 10. In the case where the request is received from the user terminal, the notifying unit 13 of the mobile robot 10 performs notification via the user terminal in addition to or in place of the operation oriented toward the client (as shown in FIG. 6).

3.2. Second Modification

The timing at which the notifying unit 13 performs the request-received notification is not limited to before the moving unit 14 starts moving. The notifying unit 13 may perform the request-received notification after the moving unit 14 starts moving. Specifically, the notifying unit 13 may perform the request-received notification while the moving unit 14 is moving.

3.3. Third Modification

The method by which the notifying unit 13 performs the request-received notification is not limited to that described in the exemplary embodiment. In a case where a request is made by gesture, if the housing 109 of the mobile robot 10 has a shape that resembles a human, the notifying unit 13 may perform the request-received notification by controlling the movements of the extremities so that the mobile robot 10 performs the same gesture as that used for making the request. Alternatively, the notifying unit 13 may perform the request-received notification by controlling the movements of the extremities so that the mobile robot 10 performs a predetermined request-received gesture.

3.4. Fourth Modification

In addition to the request-received notification, the notifying unit 13 may provide notification of the state of the mobile robot 10. The state of the mobile robot 10 is a state related to whether or not a request is receivable (e.g., a state where a request is being received, a state where a service is being provided, or a preparation state). For example, in a state where the providing unit 16 is in the process of providing a service and a request for a new service is not receivable, the notifying unit 13 provides notification of this state. Specifically, a lamp is turned on, or a message or an image indicating this state is displayed on the display device 107.

3.5. Fifth Modification

The request-received notification by the notifying unit 13 may include other information, such as a client-specifying image. The client-specifying image is, for example, an image of the client's face. In this case, upon receiving a request, the receiving unit 12 extracts the image of the client's face from the information detected by the sensor group 106 and stores the image into the storage unit 11. The notifying unit 13 displays the image of the client's face, stored in the storage unit 11, on the display device 107. As another example, the request-received notification may include a route toward the client.

3.6. Sixth Modification

The providing unit 16 may charge for each provided service. The charging method may be a prepaid method or a billing method in which services provided in a predetermined period (e.g., one month) are collectively charged afterwards. Furthermore, the providing unit 16 may perform user authentication. In this case, information to be used for the user authentication is stored in advance in the storage unit 11.

3.7. Seventh Modification

Figure 7:
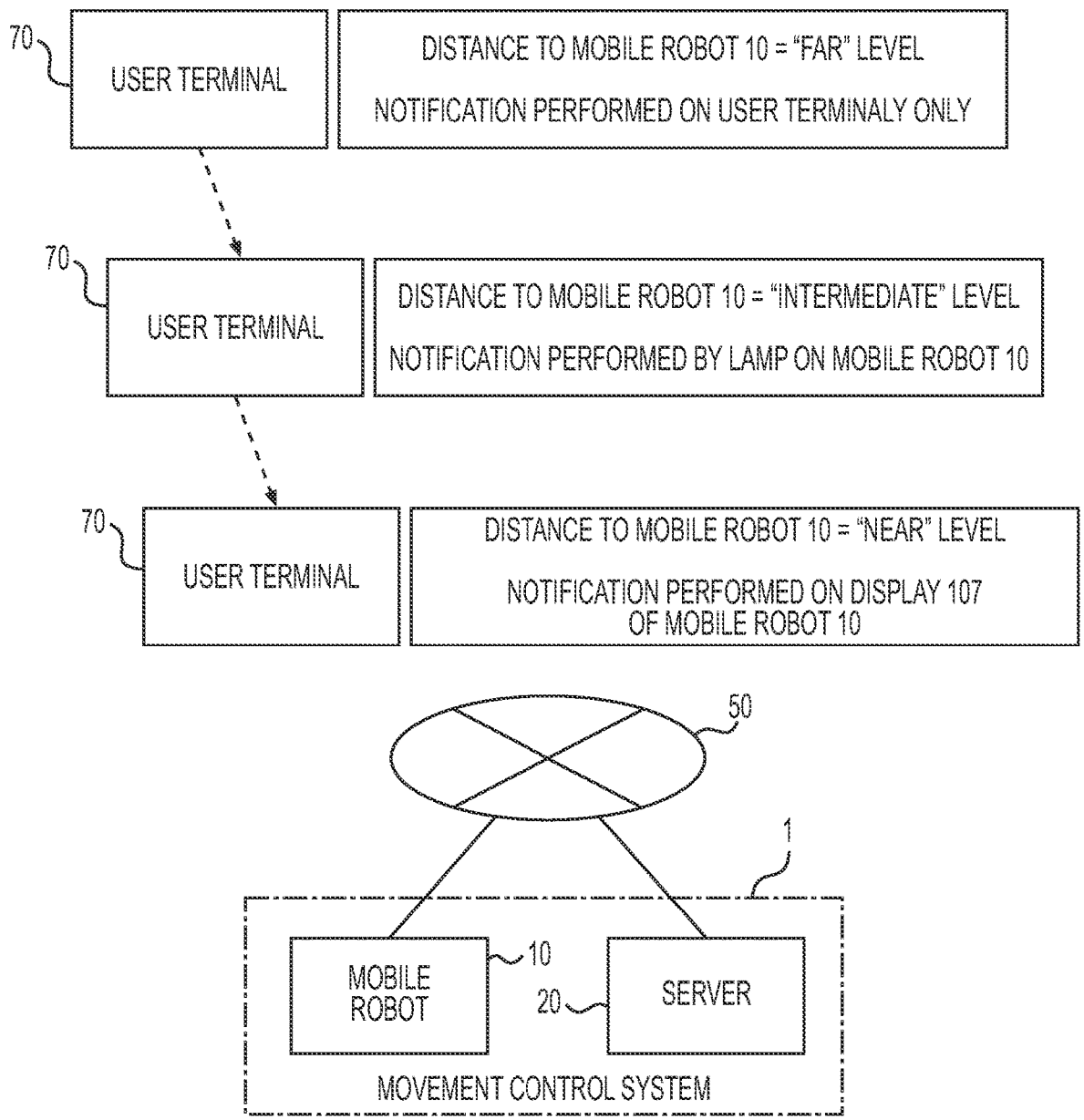
FIG. 7 illustrates the configuration of a movement control system according to a seventh modification.

The notifying unit 13 may perform the request-received notification by performing an operation that varies depending on the distance to a client. For example, as shown in FIG. 7, the distance to the client is classified into three levels, namely, a "far" level, an "intermediate" level, and a "near" level. In this case, when the distance to the client is "far", the notification is performed via a user terminal. When the distance to the client is "intermediate", only "request-received" and "request-not-received" notifications are provided by turning on a lamp. When the distance to the client is "near", an image indicating that the request is received and a client-specifying image are displayed on the display device 107. Furthermore, in a case where the request-received notification is performed while moving toward the client, the notifying unit 13 may change the operation of the request-received notification in a stepwise manner in accordance with the distance to the client.

3.8. Eighth Modification

After the notifying unit 13 performs the request-received notification, the receiving unit 12 may receive a cancellation of that request. For example, the request cancellation is received when the sensor group 106 detects a predetermined gesture (e.g., a gesture of raising both arms and cross them above the head). When the receiving unit 12 receives the request cancellation, the autonomous-movement control unit 15 stops moving toward the destination and stops the process for that request. When the process for the request stops, the autonomous-movement control unit 15 controls the moving unit 14 so as to start moving toward a destination related to a subsequent request in the sequence.

3.9. Ninth Modification

Figure 5:
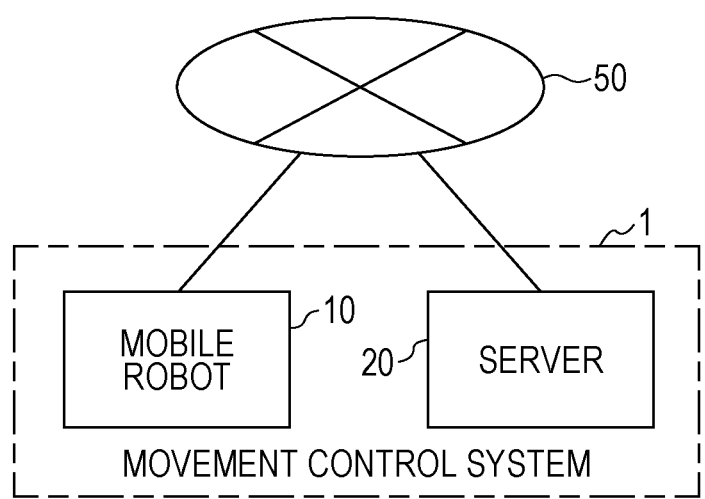
FIG. 5 illustrates the configuration of a movement control system according to a ninth modification.

FIG. 5 illustrates the system configuration of the movement control system 1 according to a ninth modification. The system configuration of the movement control system 1 is not limited to that illustrated in FIG. 1. In this example, the movement control system 1 has a server 20. The server 20 is a computer having a CPU, a memory, a storage device, and a communication unit and is connected to the mobile robot 10 via a network 50. The server 20 may have one or more of the functional components shown in FIG. 1, such as at least one of the storage unit 11, the receiving unit 12, and the autonomous-movement control unit 15.

3.10. Tenth Modification

Although the exemplary embodiment described above relates to an example in which the person requesting a service is the same as the person receiving the service, the person requesting the service and the person receiving the service do not have to be the same. For example, a subordinate (i.e., the client) may request the mobile robot 10 to provide coffee to his/her boss (i.e., the person receiving the service). In this case, the mobile robot 10 moves toward the designated person who is to receive the service, instead of moving toward the client. In the above exemplary embodiment, the client himself/herself is the person receiving the service.

3.11. Other Modifications

The hardware configuration for realizing the functions in FIG. 1 is not limited to that described in the exemplary embodiment. For example, the driving system 105 may have a component that resembles a caterpillar or the extremities of an animal or human in addition to or in place of the wheels and the tires. In another example, the driving system 105 may have a mechanism, such as a propeller, for moving through the air. Furthermore, although the single CPU 101 has the functions of the receiving unit 12, the notifying unit 13, and the autonomous-movement control unit 15 in the exemplary embodiment, at least one of these functions may be implemented in a dedicated processor. Moreover, the display device 107 may have a projector in place of the LCD. In this case, the display device 107 projects various types of information onto a ceiling or a wall surface.

At least one of the functional components shown in FIG. 1 may be omitted. Moreover, with regard to the order of the flow shown in FIG. 3, one or more of the steps may be interchanged or omitted.

The program executed by the CPU 101 in the exemplary embodiment may be provided by a storage medium, such as an optical disk, a magnetic disk, or a semiconductor memory, or may be downloaded via a communication line, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile robot comprising:
   a sensor; and
   a processor programmed to:
   detect a moving image surrounding the mobile robot from the sensor;
   recognize a person in the moving image as a client candidate;
   receive a request for a service from a user terminal via network communication;
   determine that user identifying information transmitted by the user terminal corresponds to the person recognized in the moving image as the client candidate, and specify the person as the client;
   determine a distance between the mobile robot and the user terminal;
   when the determined distance is classified into a first one of a plurality of levels, transmit, to the user terminal via network communication, a notification identifying the requested service for confirmation by the client; and
   when the determined distance is classified into a second one, different from the first one, of the plurality of levels, perform an operation oriented toward the client to output the notification identifying the requested service for confirmation by the client.

2. The mobile robot according to claim 1, wherein the operation is performed by causing a predetermined section of the mobile robot to face the client.

3. The mobile robot according to claim 1, wherein the operation is performed by outputting sound data for identifying the client.

4. The mobile robot according to claim 1, wherein the processor is programmed to:
   cause movement of the mobile robot toward a user designated as a receiver of the recognized service, after the operation is performed.

5. The mobile robot according to claim 1, wherein the processor is programmed to:
   cause movement of the mobile robot toward a user designated as a receiver of the recognized service, while the operation is being performed.

6. The mobile robot according to claim 1, wherein the processor is programmed to:
   in a case where a plurality of requests are received from a plurality of clients, perform the operation oriented toward each of the plurality of clients so as to notify which one of the plurality of requests is received from each of the plurality of clients.

7. The mobile robot according to claim 6, wherein the processor is programmed to:
   in the case where the plurality of requests are received, set a sequence based on which services related to the plurality of requests are to be provided; and
   output the notification identifying recognized requests for confirmation by the plurality of clients in accordance with the sequence.

8. The mobile robot according to claim 7, wherein the sequence is set in accordance with a timing at which each of the plurality of requests is to be started.

9. The mobile robot according to claim 1, wherein the processor is programmed to:
   receive a cancellation of the request from the client, after the notification is outputted.

10. A movement control system comprising:
    a processor programmed to:
    detect a moving image surrounding a mobile robot from a sensor;
    recognize a person in the moving image as a client candidate;
    receive a request for a service from a user terminal via network communication;
    determine that user identifying information transmitted by the user terminal corresponds to the person recognized in the moving image as the client candidate, and specify the person as the client;
    determine a distance between the mobile robot and the user terminal;
    when the determined distance is classified into a first one of a plurality of levels, transmit, to the user terminal via network communication, a notification identifying the requested service for confirmation by the client; and
    when the determined distance is classified into a second one, different from the first one, of the plurality of levels, perform an operation oriented toward the client to output the notification identifying the requested service for confirmation by the client.

11. A movement control method comprising:
    detecting a moving image surrounding a mobile robot from a sensor;
    recognizing a person in the moving image as a client candidate;
    receiving a request for a service from a user terminal via network communication;
    determining that user identifying information transmitted by the user terminal corresponds to the person recognized in the moving image as the client candidate, and specifying the person as the client;
    determining a distance between the mobile robot and the user terminal;
    when the determined distance is classified into a first one of a plurality of levels, transmitting, to the user terminal via network communication, a notification identifying the requested service for confirmation by the client; and
    when the determined distance is classified into a second one, different from the first one, of the plurality of levels, performing an operation oriented toward the client to output the notification identifying the requested service for confirmation by the client.

12. The mobile robot according to claim 1, wherein the processor is programmed to:
    when the mobile robot is moving and the determined distance between the mobile robot and the user terminal changes from being classified into the second level to being classified into the first level, change a way of outputting the notification from performing the operation oriented toward the client to transmitting the notification to the user terminal via network communication.

\* \* \* \* \*